(12) United States Patent
Eckert et al.

(10) Patent No.: US 7,827,832 B2
(45) Date of Patent: Nov. 9, 2010

(54) SUDS CONTAINER MADE OF PLASTIC FOR A WASHING MACHINE, WITH A CONNECTION FOR A VIBRATION ABSORBER

(75) Inventors: Norbert Eckert, Paderborn (DE); Benedikt Fechtel, Rheda-Wiedenbrueck (DE)

(73) Assignee: Miele & Cie. KG, Gueterslch (DE)

( * ) Notice: Subject to any disclaimer, the term of this patent is extended or adjusted under 35 U.S.C. 154(b) by 623 days.

(21) Appl. No.: 11/841,137

(22) Filed: Aug. 20, 2007

(65) Prior Publication Data

US 2008/0041188 A1 Feb. 21, 2008

(30) Foreign Application Priority Data

Aug. 21, 2006 (DE) ...................... 10 2006 038 960

(51) Int. Cl.
*D06F 29/00* (2006.01)
*D06F 35/00* (2006.01)
(52) U.S. Cl. .......................................... 68/23.1; 68/140
(58) Field of Classification Search .................. 68/23.1, 68/23.2, 23.3, 140
See application file for complete search history.

(56) References Cited

U.S. PATENT DOCUMENTS

2004/0163425 A1* 8/2004 Kim et al. ..................... 68/23.1
2005/0193779 A1* 9/2005 Kwon et al. .................. 68/23.1
2007/0044518 A1* 3/2007 Lee et al. ...................... 68/23.1

FOREIGN PATENT DOCUMENTS

DE 19725706 12/1998

* cited by examiner

*Primary Examiner*—Michael Barr
*Assistant Examiner*—David Cormier
(74) *Attorney, Agent, or Firm*—Leydig, Voit & Mayer, Ltd.

(57) ABSTRACT

A suds container for a washing machine includes plastic and is disposed so as to vibrate inside the machine housing, and includes first and second joint pieces. The first joint piece has a first bore therethrough and the second joint piece has a second bore therethrough aligned with the first bore. The first and second joint pieces are configured to fasten a vibration absorber with a fastening eye of the vibration absorber disposed between the joint pieces. A fastening element is at least partially received in the first and second bores and configured to fasten the vibration absorber. An S-shaped molded part is disposed on the joint pieces and includes third and fourth aligned bores and a first and a second arched area. The first arched area has a U-shape and is disposed between the joint pieces. The second arched area extends so as to overlap a free end of the first joint piece at an outer portion thereof.

18 Claims, 6 Drawing Sheets

SUDS CONTAINER MADE OF PLASTIC FOR A WASHING MACHINE, WITH A CONNECTION FOR A VIBRATION ABSORBER

Priority is claimed to German patent application DE 10 2006 038 960.3, filed Aug. 21, 2006, and which is hereby incorporated by reference herein.

The invention relates to a suds container made of plastic for a washing machine in whose horizontal axis a driven washing drum is mounted so as to rotate and the suds container made of plastic is arranged so as to vibrate inside the machine housing, whereby two joint pieces through which flush bores run are provided to fasten at least one vibration absorber to the suds container made of plastic, whereby a fastening eye of the vibration absorber is arranged between the joint pieces, and for purposes of affixing the vibration absorber, a fastening element that traverses the bores as well as the fastening eye is arranged on the joint pieces.

BACKGROUND

Vibration absorbers on vibrating aggregates of automatic washers have the function of absorbing movement in their direction of action in case of unbalance caused by the laundry as well as the function of preventing thumping or "walking" by the device. Torsional movements of the suds container around the drum axis, however, are only introduced into the shock absorbers by the associated shifting of the fastening point. The fastening points of the absorber on the suds container and on the fastening element on the housing side can also transmit torques. In the case of steel aggregates and floor tubs, the transmission capability is provided by a firmly screwed-on connection that creates a non-positive connection via the prestressing force. This is not feasible in this manner with plastic elements since the requisite force would damage the plastic and its relaxation would cause a rapid drop in the prestressing.

In order to obtain a pivot axis that is as vibration-damped as possible, German patent application DE 197 25 706 A1 describes a fastening device in which the fastening element consists of two spreadable sleeve segments arranged perpendicular to the pivot axis. Even though the spreading of the fastening element provides a certain stiffening of the pivot axis, this prior-art spreading sleeve cannot be used for suds containers made of plastic and here especially for the joint pieces that are shaped onto the suds container made of plastic.

SUMMARY

Therefore, it is an aspect of the present invention to provide an improved a suds container made of plastic in terms of the fastening of the vibration absorber.

In an embodiment, the present invention provides a suds container for a washing machine having a driven washing drum disposed so as to rotate about a horizontal axis of the washing machine. The suds includes plastic and is disposed so as to vibrate inside the machine housing, and includes first and second joint pieces. The first joint piece has a first bore therethrough and the second joint piece has a second bore therethrough aligned with the first bore. The first and second joint pieces are configured to fasten a vibration absorber with a fastening eye of the vibration absorber disposed between the joint pieces. A fastening element is at least partially received in the first and second bores and configured to fasten the vibration absorber. An S-shaped molded part is disposed on the joint pieces and includes third and fourth aligned bores and a first and a second arched area. The first arched area has a U-shape and is disposed between the joint pieces. The second arched area extends so as to overlap a free end of the first joint piece at an outer portion thereof.

BRIEF DESCRIPTION OF THE DRAWINGS

An embodiment of the invention will be explained in greater detail with reference to FIGS. 1 to 5 below. The following are shown.

DETAILED DESCRIPTION

The embodiment according to the invention allows transmission of the torque into the fastening points of the shock absorbers in order to attain the high level of absorption of the unbalance. The stress on the plastic and ultimately the magnitude of the transmittable torque can be adjusted precisely and reliably by means of the sleeve or by the collar of the screw or nuts. The forces are absorbed or transmitted via frictional grip to the insides of the joint pieces shaped onto the suds container. This is done via the prestressing force of the screw. As a result of this defined prestressing, the plastic is stressed only to the extent that it can withstand while experiencing little or no lasting deformation, and additionally a torque can be transmitted over the surface.

It is advantageous in the case of the so-called cage solution that the use of this type of connection accounts for a reduction of parts and installation time since no washers are needed between the fastening eye of the vibration absorber and the inner surfaces of the joint pieces. For this purpose, an S-shaped molded part with flush bores is integrated into the area of the adjacent joint pieces in order to transmit the shock absorber torque. In this context, the first arched area is configured to be U-shaped and is arranged between the joint pieces or between the inner plastic surfaces of the joint pieces, whereby the second arched area is arranged so as to overlap one of the free joint pieces. Owing to this design, the molded part can be easily inserted and positioned.

In an embodiment, a holding device is arranged on the second arched area that extends beyond one of the flush leg bores and it serves to hold the nuts of a screw shaft that traverses the bores of the joint pieces as well as the molded part. As a result, the nuts are secured against turning when the fastening element is tightened via the screw shaft. Here, the holding device is configured for a square nut.

In an embodiment, the joint pieces form a bearing block that essentially has a U-shape. This results in a particularly stable and reliable fastening of the vibration absorber.

Especially in order to absorb the torque forces in the area of the bearing block, the flush bores of the first arched area—which fits into the U-shape of the bearing block between the joint pieces—each have a diameter that matches the inner diameter of the fastening eye. This is particularly advantageous if the fastening eye contains an elastically mounted articulated bushing, thus preventing that this bushing can press or eat into the plastic of the joint pieces. Consequently, a firm contact surface is created that can also be tightened accordingly with the screw bolt.

In an embodiment, the flush bore of the second arched area—which overlaps one of the flush bores of the one joint piece end—has a correspondingly larger diameter than the bores in the joint piece. This is employed to position a flanged sleeve in the bores of the molded part and legs on the nut side that serves to bridge the diameter difference in the screw shaft.

In order to be able to exert sufficient force onto the bearing block, the screw head of the screw shaft has an enlarged contact surface.

The screw shaft as such is configured in such a way that the screw head is followed by an area that corresponds to the diameter of the bore in the joint piece that is followed by the shaft whose diameter corresponds to the inner diameter of the fastening eye or of the articulated sleeve, to the diameters of the bores of the first arched area as well as to the diameter of the flanged sleeve.

In an embodiment, the screw shaft is fitted on the area with the larger diameter with a channel or else provided with a channel at the transition area to the area with the larger diameter.

In an embodiment, the molded part is made of a single piece of bent metal, so that, as a result of the insertion of the molded part, the nut is secured and the bearing block is also tightened. Then all that is necessary is for the screw shaft to be inserted in order to tighten the entire fastening system by means of the screw head.

In an embodiment, the molded part is resilient so that it is held in position in the U-shaped area due to the clamping effect against the inside of the joint pieces. As a result, it cannot be lost during the installation after it has been inserted into the bearing block.

In another embodiment, the second arched area of the molded part is resilient so that it overlaps the outside of the free joint piece end with a clamping effect. As a result, during the installation, the predefined position of the molded part in the bearing block is retained and the molded part is securely held.

In an embodiment, the sides of the joint pieces facing the inside each have a guide projection by means of which the first arched area of the S-shaped molded part can be positioned. Consequently, the molded part is reliably secured against turning. The insertion of the molded part is likewise facilitated by this guide.

In an embodiment, the free edges of the joint pieces have an insertion slant on their insides. This makes it easier to insert the shock absorber eye into the first arched area of the molded part.

In an embodiment, external guide webs are installed on the joint piece that is enclosed by the second arched area, and the holding device and/or the nut can be inserted and positioned between said guide webs. In this context, the cage-like holding device is guided into the correct position for the nuts while it is being inserted, whereby the webs prevent the nuts from turning along during the screwing procedure.

In another embodiment, an indentation into which the crown area of the second arched area can be inserted is arranged as a coding means on the free end of the joint piece for the second arched area. This indentation is only situated on this one joint piece and it is configured in such a way that the nut only comes to lie flush with the bore once the crown area has been completely inserted into the indentation. This prevents the molded part from being installed backwards.

Figure 1:
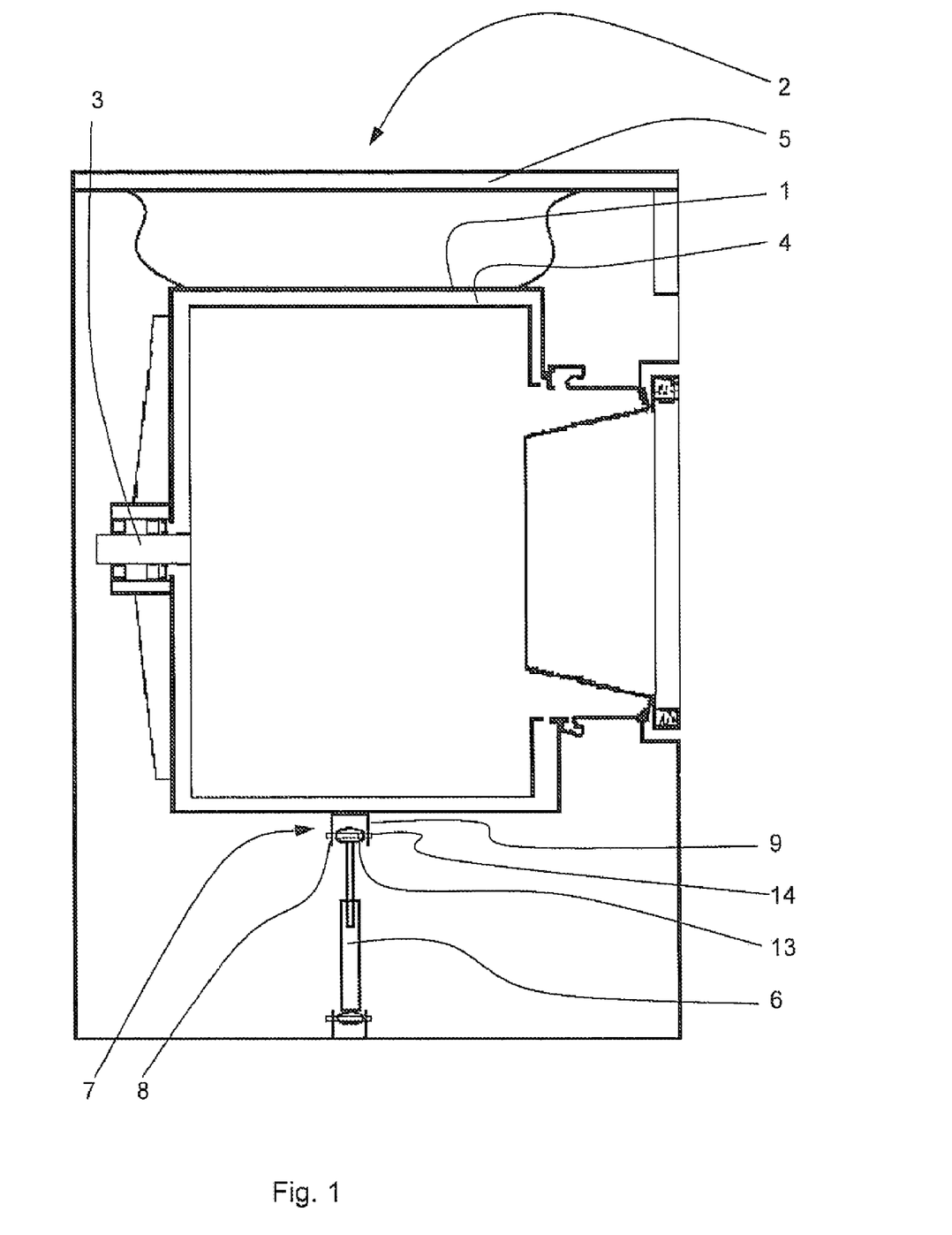
FIG. 1—a schematic view of the housing of a washing machine with a washing aggregate inside it that is vibration-damped.
Figure 2:
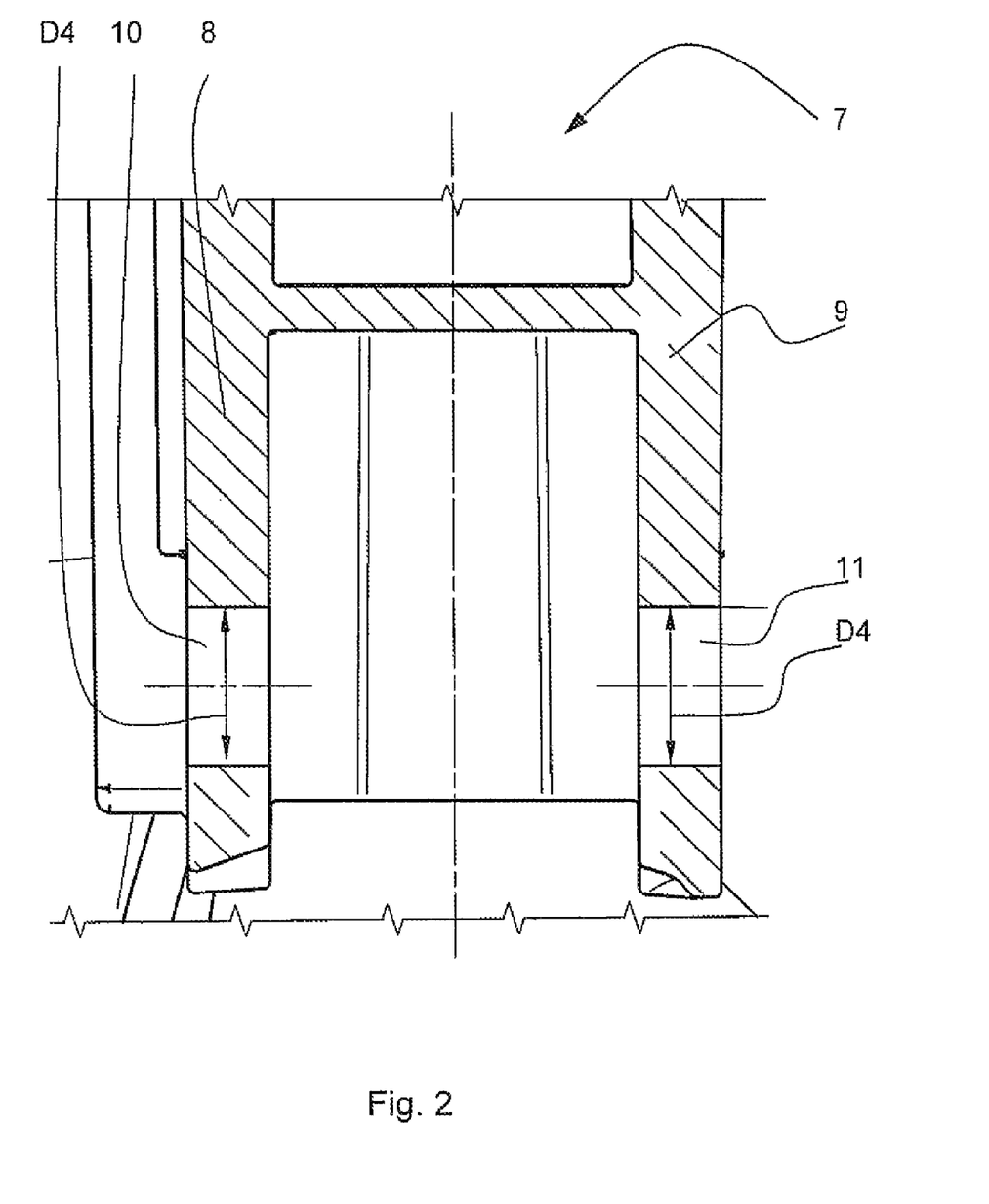
FIG. 2—a detailed view of a bearing block shaped onto a suds container made of plastic.

FIG. 1 shows a schematic diagram of a suds container 1 made of plastic for a washing machine 2 in whose horizontal axis 3 a driven washing drum 4 is mounted so as to rotate. The suds container 1 made of plastic is arranged so as to vibrate inside the machine housing 5, whereby at least one vibration absorber 6 is provided on a bearing block 7 on the suds container 1 made of plastic. As can be clearly seen in the schematic diagram, the bearing block 7 essentially has a U-shape through whose joint pieces 8 and 9 flush bores 10 and 11 run, which can be better viewed in the detailed view in FIG. 2. According to FIG. 3, the fastening eye 13 or an articulated bushing 12 elastically mounted therein is arranged between the joint pieces 8 and 9. Owing to the elastically mounted articulated bushing 12, a vibration-damped pivot axis is formed inside the fastening eye 13. For purposes of affixing the vibration absorber 6, a fastening element 14 that traverses the bores 10 and 11 (FIG. 2) as well as the articulated bushing 12 is arranged on the bearing block 7.

Figure 3:
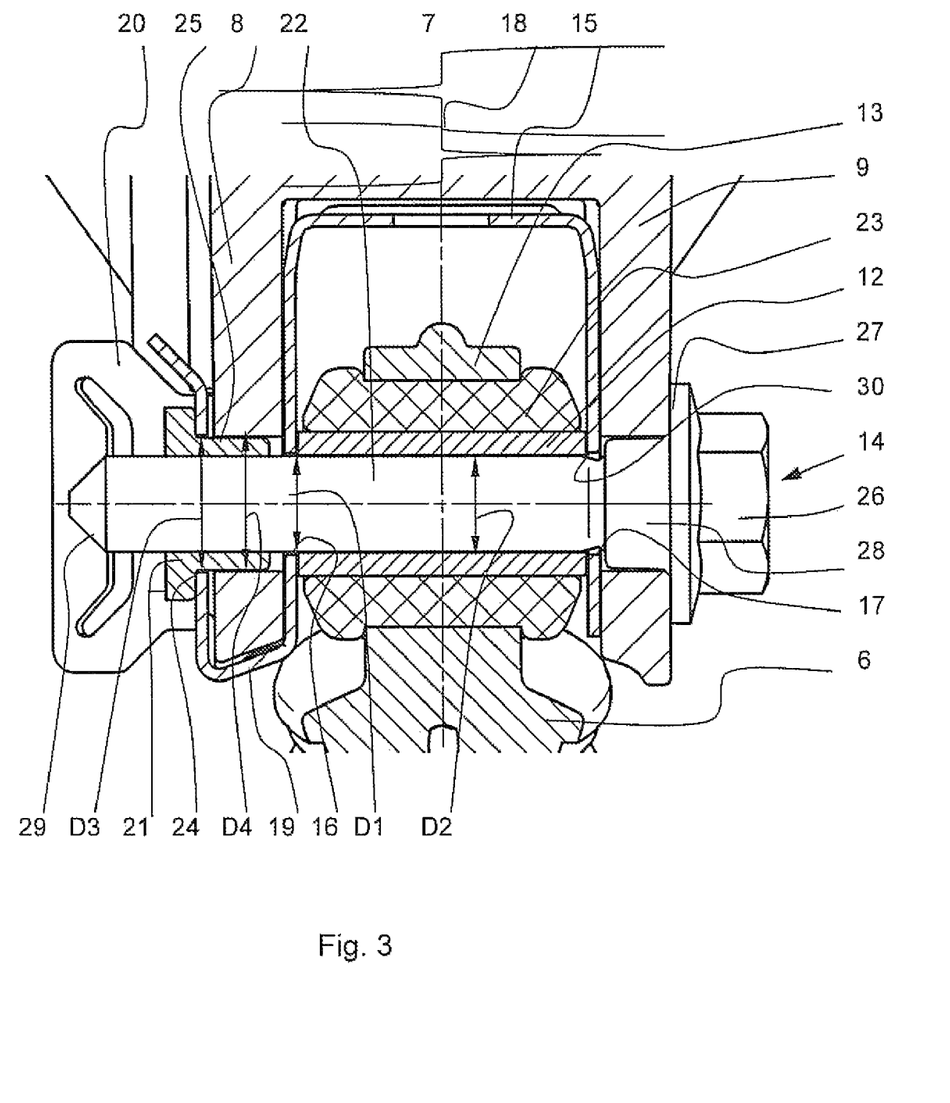
FIG. 3—a sectional view of the fastening element of a fastening eye of a shock absorber between the joint pieces of a bearing block, in a side view.

FIG. 3 shows that, for purposes of force transmission or in order to transmit a high shock-absorber torque onto the inner plastic surfaces of the joint pieces 8 and 9 in the area of the bearing block 7, an S-shaped molded part 15 with flush bores 16 and 17 is integrated into the bearing block 7, and the first arched area 18 of this S-shaped molded part, which matches the U-shape of the bearing block 7, is arranged between the insides of the joint pieces 8 and 9, whereby the second arched area 19 extends so as to overlap—on the outside—one of the free joint piece ends, here 8. This yields a molded part 15 that, on the one hand, fits positively between the joint pieces 8 and 9 and that, on the other hand, is secured against turning by the overlapping second arched area 19, whereby it is also ensured that this design also achieves a self-holding of the molded part 15 in the shaped-on bearing block 7, thus allowing easy installation of the parts needed to complete the fastening element. In this context, the molded part 15 is made of a single piece of bent metal, whereby the resilient property of the metal provides a clamping effect of the first arched area 18 between the joint pieces 8 and 9 and/or of the second arched area 19 on the outside around the free end of the one joint piece 8.

Figure 4:
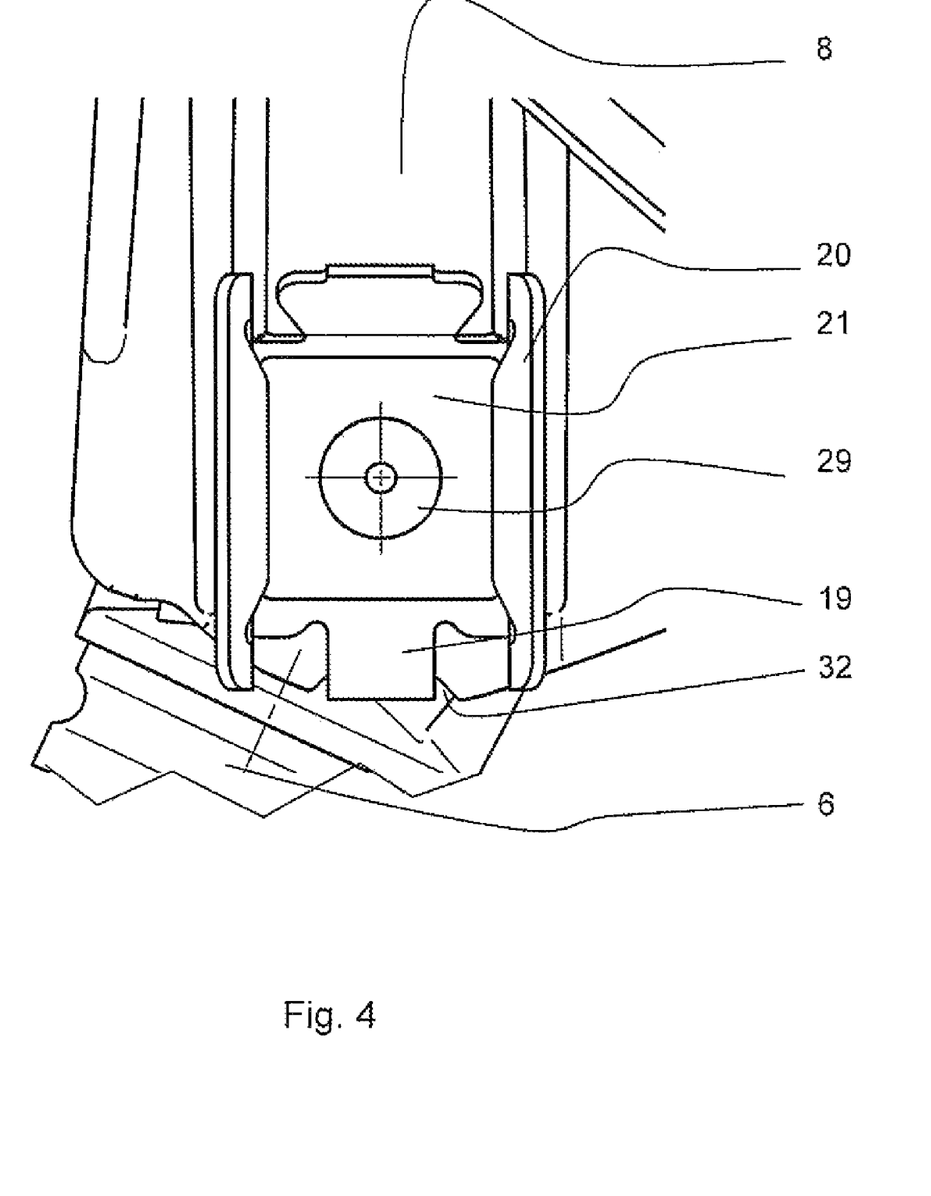
FIG. 4—another perspective view of the holding device.

Here, a holding device 20 configured as a cage for a nut 21 is arranged on the second arched area 19 that especially protrudes beyond one of the bores in the flush joint piece. The screw shaft 22 that traverses the bores 10 and 11 of the joint pieces 8 and 9 is screwed into this nut 21. The holding device 20, especially as shown in FIG. 4, is configured to accommodate a square nut 21. As can be seen in FIG. 3, an elastically mounted articulated bushing 12 is situated in the fastening eye 13, whereby here, an elastomer ring 23 is pressed around the articulated bushing 12 around which the fastening eye 13 of the shock absorber 6 then lies. This gives rise to an enclosed articulated bushing 12 which especially transmits a torque in a vibration-damped manner to the joint pieces 8 and 9.

FIG. 4 depicts a side view of the outside of the joint piece 8, showing that the second arched area 19 at least partially overlaps the joint piece on the outside. The cage-like holding device 20 is arranged on or shaped in one piece onto this second arched area 19. The square nut 21, into whose threaded opening the free shaft end 29 protrudes or is screwed in, is placed into this holding device and it is fastened or supported via the fastening eye 13 (FIG. 3) of the shock absorber 6 located behind the joint piece 8. On the free end of this joint piece 8, there is also an indentation 32 as a coding means that is situated in the crown area of the second arched area 19. The indentation 32 is only placed on this one joint piece 8 and it is configured in such a way that the nut 21 only comes to lie flush with the bore once the crown area has been completely inserted into the indentation 32. If the molded part is mounted backwards, then the crown area lies on the free end of the joint piece 9 without an indentation. In this case, the nut 21 is not positioned so as to be flush with the bore 11 (FIG. 2) in the joint piece 9. With this incorrect positioning of the molded part 15, the screwing operation is not possible.

Particularly in order to be able to systematically transmit the tightening forces onto the articulated bushing 12 or onto the inner surfaces of the plastic joint pieces 8 and 9, the flush bores 16 and 17 of the first arched area 18, which fits into the U-shape of the bearing block 7 between the legs 8 and 9, each have diameters D1 that correspond to the inner diameter D2 of the articulated bushing 12. This can be clearly seen in FIG. 3, whereby essentially a flush alignment exists between the inner diameter D2 and the diameter D1. The flush bore 24 of the second arched area 19, which extends so as to overlap one of the flush bores, here 10, of the joint piece 8, has a correspondingly larger diameter D3 than the bores D4 in the joint piece. It can be seen in FIG. 3 that a flanged sleeve 25 is arranged in the bore 24 on the nut side and in the bore 10 of the joint piece, here 8, said flanged sleeve bridging the diameter difference between D1, D2 and D3, D4 relative to the screw shaft 22.

As can be seen in FIG. 3, the screw head 26 of the screw shaft 22 has an enlarged contact surface 27 that brings about sufficient screwing or tightening force onto the outer surface of the joint piece 9. Here, the screw head 26 is followed by an area 28 that corresponds to the diameter area D4 of the bore in the joint piece which is followed by the shaft 22 whose diameter corresponds to the inner diameter D2 of the articulated bushing 12, to the diameters D1 of the bores 16 and 17 of the first arched area 18 as well as to that of the flanged sleeve 25.

As can also be seen in FIG. 3, the screw shaft 22 is provided with a channel 30 at the transition area to the area 28 of the screw head 26, whereby the shaft 22 has a larger diameter D2 as it continues towards the end.

It goes without saying that, prior to the fastening, first the molded part 15 is inserted into the bearing block 7. Then the flanged sleeve 25 is fitted onto the joint piece 8, before the fastening eye 13 with its elastically mounted articulated bushing 12 is inserted between the joint pieces 8, 9 in such a way that the screw shaft 22 can be put through the flush bores 10 and 11. Once this has been done, all that is left is to insert a nut 21 into the cage-like holding device 20 that self-tightens when the screw head 26 is tightened. The holding device 20 is configured in such a way that the nut 21 can be first inserted in a pre-latching position and positioned together with the molded part 15 in or on the bearing block 7. The tightening of the parts ensures a vibration-damped torque. Here, the forces are transmitted by the articulated bushing 12 directly onto the molded part 15 which, in turn, transfers the forces over a large surface onto the inner surfaces of the joint pieces 8, 9. Therefore, this molded part 15 especially has the advantage that high tightening forces can be transmitted to a bearing block 7 made of plastic or to the joint pieces 8 and 9.

Figure 5:
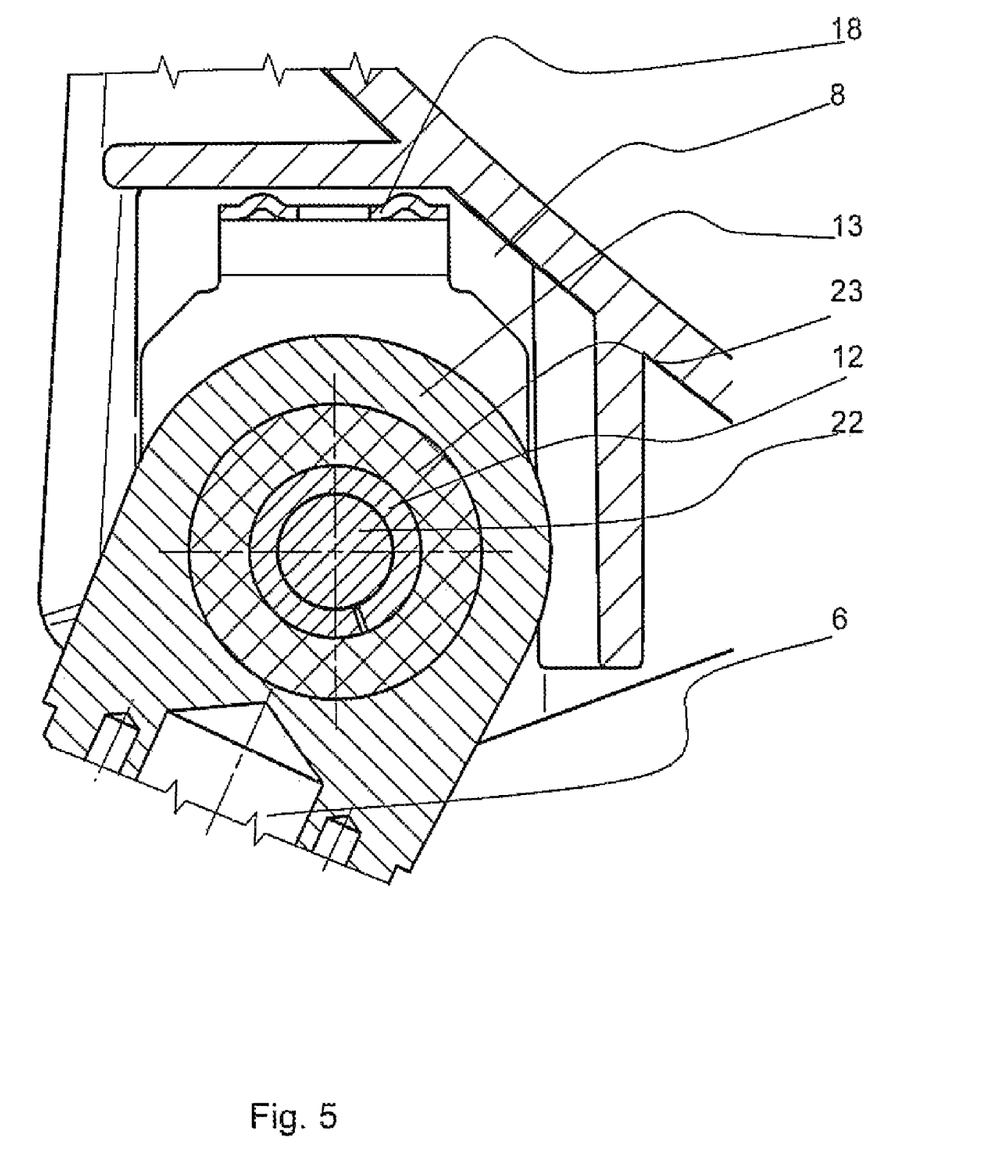
FIG. 5—another sectional view through the fastening eye of a shock absorber.

FIG. 5 once again shows an isolated sectional view of the fastening eye 13 of the vibration absorber 6 in which the elastic ring 23 lies into which, in turn, the articulated bushing 12 is integrated which is traversed by the screw shaft 22. Behind the fastening eye 13, part of the first arched area 18 of the molded part 15 (FIG. 3) can be seen that provides the lateral contact surface of the fastening eye 13 or of the articulated bushing 12 on the joint piece 8.

Figure 6:
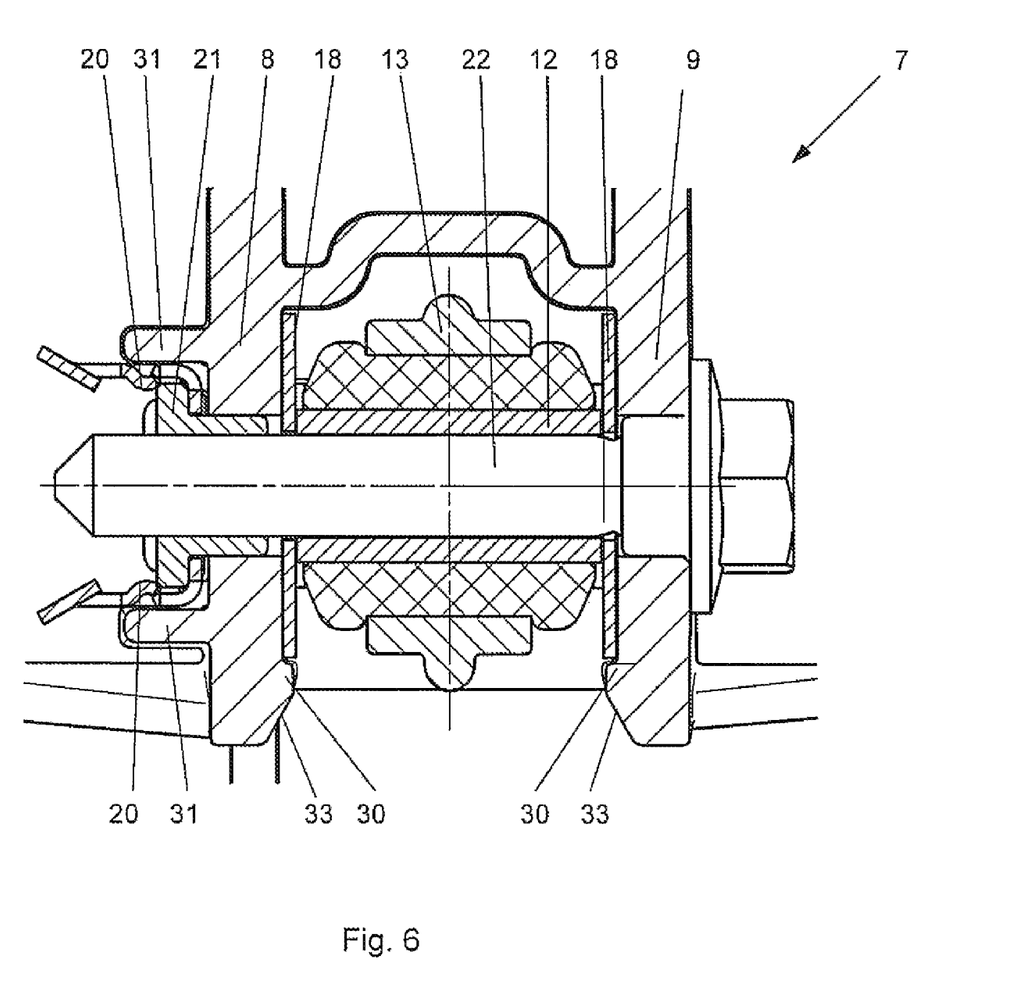
FIG. 6—a sectional view of the fastening element, in a top view.

FIG. 6 shows a top view of the bearing block 7 in the form of a sectional view. All information on direction relates to the normal operating position of the washing machine. Guide projections 30 are arranged on the free edge on the inner surfaces of each of the joint pieces 8 and 9. Behind the guide projections is the first arched area 18 of the molded part 15 (FIG. 3). Moreover, insertion slants 33 that make it easier to insert the fastening eye 13 or the articulated bushing 12 are arranged on the free ends of the joint pieces 8 and 9. In addition, the first arched area 18 is prevented from turning around the screw shaft 22 that acts like an axis. On the outside of the joint piece 8, which is enclosed by the second arched area 19 (FIG. 3), there are two guide webs 31 that run essentially parallel. The holding device 20 with the nut 21 is inserted between these guide webs 31. In addition to providing good guidance, this approach also secures the nut 21 against turning when the screw shaft 22 is being screwed in.

The present invention is not limited to the exemplary embodiments described herein.

What is claimed is:

1. A suds container for a washing machine including a driven washing drum disposed so as to rotate about a horizontal axis of the washing machine, the suds container including plastic and being disposed so as to vibrate inside a housing of the washing machine, the suds container comprising:
   first and second joint pieces, the first joint piece having a first bore therethrough and the second joint piece having a second bore therethrough aligned with the first bore, the first and second joint pieces being configured to fasten a vibration absorber with a fastening eye of the vibration absorber disposed between the joint pieces;
   a fastening element at least partially received in the first and second bores and configured to fasten the vibration absorber;
   an S-shaped molded part disposed on the joint pieces and including third and fourth aligned bores, the S-shaped molded part including a first and a second arched area, the first arched area having a U-shape, the first arched area being disposed between the joint pieces, the second arched area extending so as to overlap a free end of the first joint piece at an outer portion thereof; and
   a tub portion, the first and second joint pieces being shaped onto the tub portion.

2. The suds container as recited in claim 1 wherein the S-shaped molded part is integrated with the joint pieces.

3. The suds container as recited in claim 1 further comprising:
   a nut associated with the first bore;
   a holding device for the nut; and
   a screw shaft at least partially received in the first and second bores;
   wherein the holding device and at least a portion of the shaft are disposed on the second arched area of the S-shaped molded part.

4. The suds container as recited in claim 3 wherein the nut is a square nut.

5. The suds container as recited in claim 1 wherein the joint pieces form a bearing block having a substantial U-shape.

6. The suds container as recited in claim 1 wherein the third and fourth bores each have a respective diameter substantially matching an inner diameter of the fastening eye.

7. The suds container as recited in claim 1 wherein the S-shaped molded part includes a fifth bore aligned with the third and fourth bores, the fifth bore being disposed in the second arched area, and wherein the second arched area overlaps the first bore, the fifth bore having a larger diameter than a diameters of the first and second bores.

8. The suds container as recited in claim 7 further comprising:
   a screw shaft at least partially received in the first and second bores; and
   a flanged sleeve at least partially received in the first and fifth bores and configured to bridge a diameter difference of the first and fifth bores relative to the screw shaft.

9. The suds container as recited in claim 3 wherein the screw shaft includes a screw head having a contact surface having a diameter larger than a diameter of an adjacent portion of the screw head.

10. The suds container as recited in claim 9 further comprising a flanged sleeve at least partially received in the first and fifth bores and configured to bridge a diameter difference of the first and fifth bores relative to the screw shaft, and wherein the screw shaft includes:
   a first area having a diameter that corresponds to a diameter of the second bore, the first area being adjacent to the screw head; and
   a second area having a diameter corresponding to an inner diameter of the fastening eye, to the respective diameters of the third and fourth bores, and to a diameter of the flanged sleeve, the second area being adjacent to the first area.

11. The suds container as recited in claim 10 wherein the diameter of the second bore is larger than the diameter of the fourth bore, and wherein the screw shaft includes a channel disposed at a transition area between the first and second areas.

12. The suds container as recited in claim 1 wherein the S-shaped molded part is made of a single piece of bent metal.

13. The suds container as recited in claim 1 wherein the S-shaped molded part is held in position in the U-shape of the first arched area against inner sides of the joint pieces by a clamping effect.

14. The suds container as recited in claim 1 wherein the second arched area of the S-shaped molded part overlaps the free end of the first joint piece in a clamping manner.

15. The suds container as recited in claim 1 wherein respective inner sides of the joint pieces each have a respective guide projection configured to assist in positioning of the first arched area of the S-shaped molded part.

16. The suds container as recited in claim 15 wherein the free end of the first joint piece and a free end of the second joint piece each have a respective insertion slant at a respective inner side thereof.

17. The suds container as recited in claim 3 wherein the first joint piece includes first and second external guide webs configured to assist in an inserting and positioning of at least one of the holding device and the nut between the guide webs.

18. The suds container as recited in claim 1 wherein the free end of the first joint piece includes a coding indentation configured to receive a crown area of the second arched area of the S-shaped molded part.

* * * * *